(No Model.)
F. G. BROWNELL.
PACKING FOR VALVE STEMS AND PISTON RODS.
No. 343,003. Patented June 1, 1886.
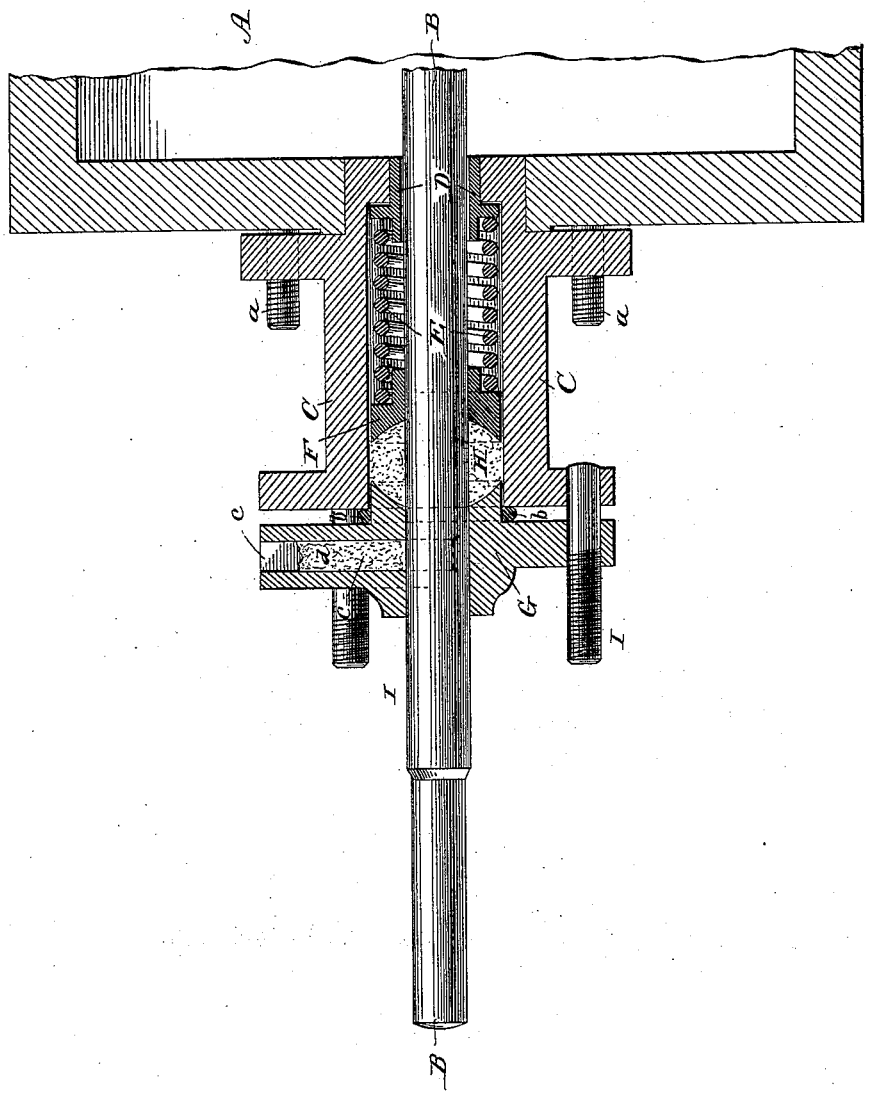

United States Patent Office.

FREDERICK G. BROWNELL, OF BURLINGTON, VERMONT, ASSIGNOR OF ONE-HALF TO THEODORE S. PECK, OF SAME PLACE.

PACKING FOR VALVE-STEMS AND PISTON-RODS.

SPECIFICATION forming part of Letters Patent No. 343,003, dated June 1, 1886.

Application filed March 12, 1886. Serial No. 194,990. (No model.)

*To all whom it may concern:*

Be it known that I, FREDERICK G. BROWNELL, of Burlington, in the State of Vermont, have invented a new and useful Improvement in Packings for Valve-Stems and Piston-Rods, of which the following is a specification.

My invention consists in a valve-stem or piston-rod packing, the parts of which are constructed and arranged for operation in the manner hereinafter described, the object being to obtain a cheap, effecient, and durable packing of the kind named.

In the accompanying drawing is represented in longitudinal central section a packing made in accordance with my invention.

A is a portion of the steam-chest, and B is a portion of the valve-stem.

C is the stuffing-box, bolted to the steam-chest at *a*. Its rear end enters the steam-chest, and in an opening therein is a flanged bearing-sleeve, D, having on each side of its flange a hub, one of which forms a guide for the spring E, and the other of which enters the steam-chest or that end of the stuffing-box which extends into the steam-chest and forms a guide for the valve-stem. The flange itself forms a rest or bearing for the spring E, which presses and holds in its seat the sleeve D. Within the stuffing-box is a loose collar, F, which is provided on its face adjoining the spring E with a hub, which is encircled by and forms a guide for the spring. The outer face of this collar is concave or cup-shaped. The gland is represented at G. That end of it which enters the stuffing-box is concave or cup-shaped, like the collar F, and in the space between the two is asbestus, soapstone, flax, or other suitable packing, H. The shape of the concaves on the ends of the gland and collar are such that but very little pressure is required upon the packing H in order to force it up against the valve-stem.

The bolts and nuts by which the gland and stuffing-box are drawn and held together are represented at I. Between the meeting flanges of the gland and stuffing-box is interposed a lead or copper wire gasket, *b*, to make a steam-tight joint between them. The spring is confined between and supported, steadied, and guided by the collar F and flanged sleeve D, the latter furnishing, also, a guide for the valve-stem.

Steam as it follows the valve-stem out through the sleeve will condense or partly condense in the stuffing-box, and this water will, by the action of the succeeding steam, be pressed up through the collar and against the packing, thereby making a water-packing and steam-tight joint, and serving to some extent also to keep the stem lubricated. To afford thorough lubrication to the stem, the gland is cast with a recess or chamber, *c*, in its top, which extends from the outside to the inside of the gland, and is intended to contain woolen waste or other substance, *d*, to hold the oil and supply it to the valve-stem, and to keep grit or dirt from drawing into the packing.

Having now described my improvement, what I claim, and desire to secure by Letters Patent, is—

The stuffing-box C, the gland G, provided with a concave inner face, the correspondingly-concave collar F, provided with a guide-hub, the packing H, the flanged sleeve D, provided on one side of its flange with a guide-hub for the spring, and on the other side with a hub that enters the steam-chest and forms a guide for the valve-stem at that point, and the spring E, confined between said sleeve and collar and encircling the hub thereon, all constructed and arranged as hereinbefore shown and specified.

In testimony whereof I have hereunto set my hand this 9th day of March, 1886.

FREDERICK G. BROWNELL.

Witnesses:
ARTHUR R. ST. PETERS,
HARVEY T. RUTTER.